United States Patent
Tohzaka et al.

(10) Patent No.: US 9,571,214 B2
(45) Date of Patent: Feb. 14, 2017

(54) WIRELESS COMMUNICATION APPARATUS AND WIRELESS COMMUNICATION SYSTEM

(71) Applicant: KABUSHIKI KAISHA TOSHIBA, Minato-ku, Tokyo (JP)

(72) Inventors: Yuji Tohzaka, Kawasaki (JP); Hiroki Kudo, Kawasaki (JP); Takafumi Sakamoto, Machida (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 280 days.

(21) Appl. No.: 14/309,656

(22) Filed: Jun. 19, 2014

(65) Prior Publication Data
US 2014/0376533 A1    Dec. 25, 2014

(30) Foreign Application Priority Data

Jun. 21, 2013    (JP) ................. 2013-130386

(51) Int. Cl.
*H04J 3/06*    (2006.01)

(52) U.S. Cl.
CPC ............ *H04J 3/0664* (2013.01); *H04J 3/0641* (2013.01)

(58) Field of Classification Search
None
See application file for complete search history.

(56) References Cited

U.S. PATENT DOCUMENTS

| | | | | |
|---|---|---|---|---|
| 4,142,069 A | * | 2/1979 | Stover | H04J 3/0679 370/507 |
| 5,363,375 A | * | 11/1994 | Chuang | H04J 3/0679 370/332 |
| 5,363,376 A | * | 11/1994 | Chuang | H04B 7/2696 370/332 |
| 5,734,986 A | * | 3/1998 | Helders | H04W 76/02 370/503 |

(Continued)

FOREIGN PATENT DOCUMENTS

JP    2008271535 A    11/2008

OTHER PUBLICATIONS

U.S. Appl. No. 13/836,311, filed Mar. 15, 2013, First Named Inventor: Yuji Tohzaka, Title: "Wireless Communication Apparatus".

(Continued)

*Primary Examiner* — Gregory Sefcheck
*Assistant Examiner* — Rina Pancholi
(74) *Attorney, Agent, or Firm* — Holtz, Holtz & Volek PC

(57) ABSTRACT

According to an embodiment, a wireless communication unit includes a media access control (MAC) unit. The MAC unit includes a clock unit, an acquisition unit and a calculation unit. The clock unit includes a register which stores periodically counted-up first time information. The acquisition unit acquires a statistic for reception quality information on the received packet. The calculation unit normalizes the second time information, weights the normalized second time information using a time weight based on the statistic, and calculates a time correction value for correcting the first time information, using the weighted and normalized second time information. The time weight increases with increasing link stability indicated by the statistic.

12 Claims, 9 Drawing Sheets

(56) References Cited

U.S. PATENT DOCUMENTS

| | | | | |
|---|---|---|---|---|
| 6,212,398 B1* | 4/2001 | Roberts | ............... | H04B 1/1615 |
| | | | | 370/311 |
| 7,974,402 B2 | 7/2011 | Pun | | |
| 2002/0188723 A1* | 12/2002 | Choi | ..................... | H04W 36/06 |
| | | | | 709/225 |
| 2011/0019698 A1* | 1/2011 | Akae | ..................... | H04J 3/0664 |
| | | | | 370/509 |

OTHER PUBLICATIONS

U.S. Appl. No. 14/025,761, filed Sep. 12, 2013, First Named Inventor: Takafumi Sakamoto, Title: "Inverter Apparatus and Inverter System".

* cited by examiner

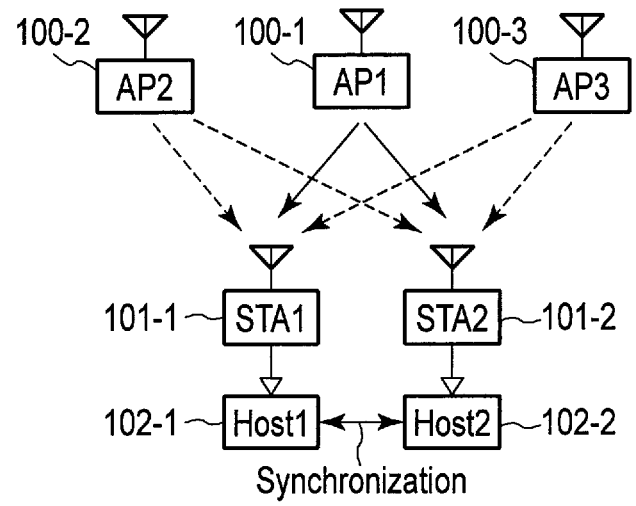
F I G. 1
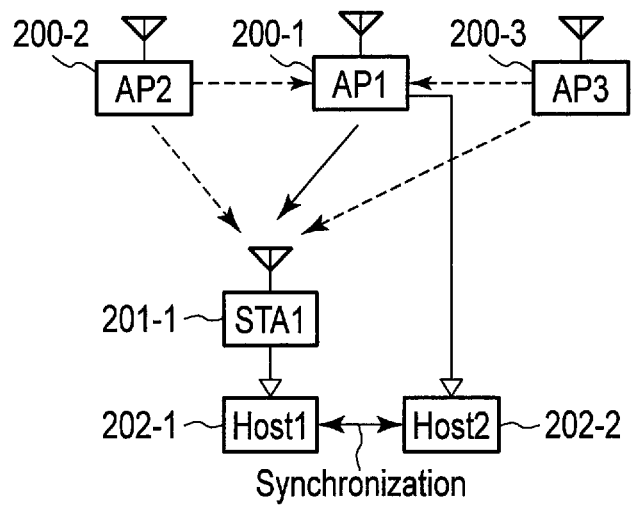
F I G. 2

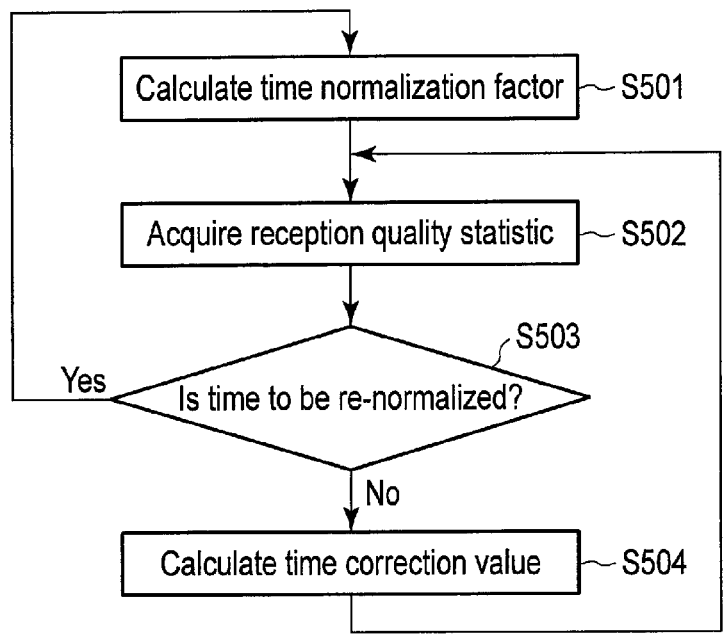
F I G. 5
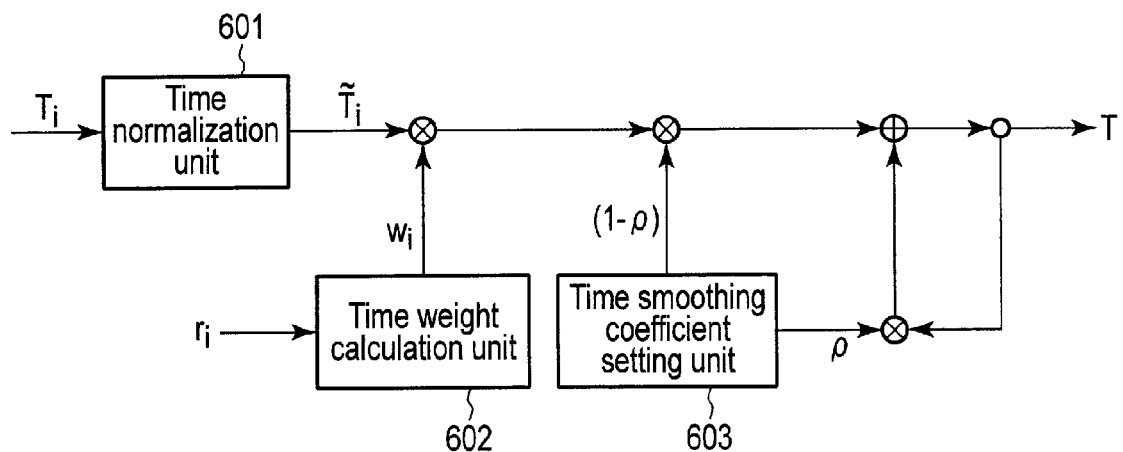
F I G. 6

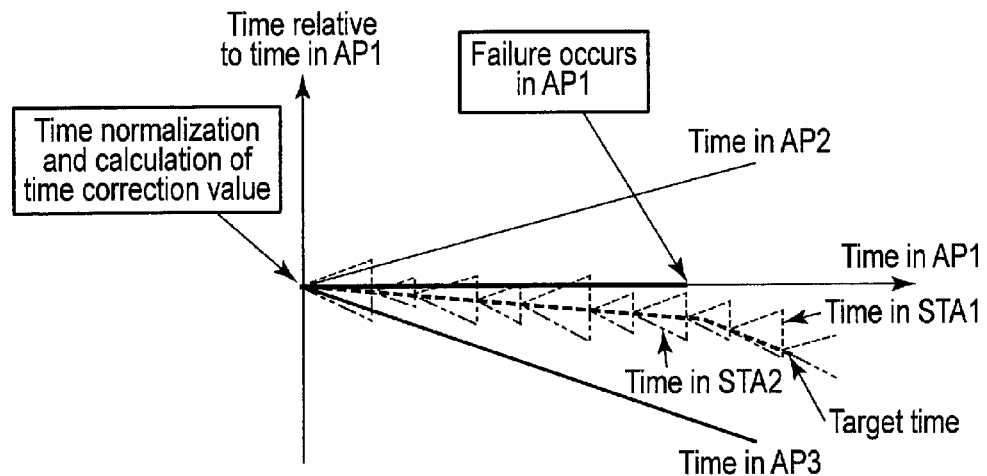
F I G. 7
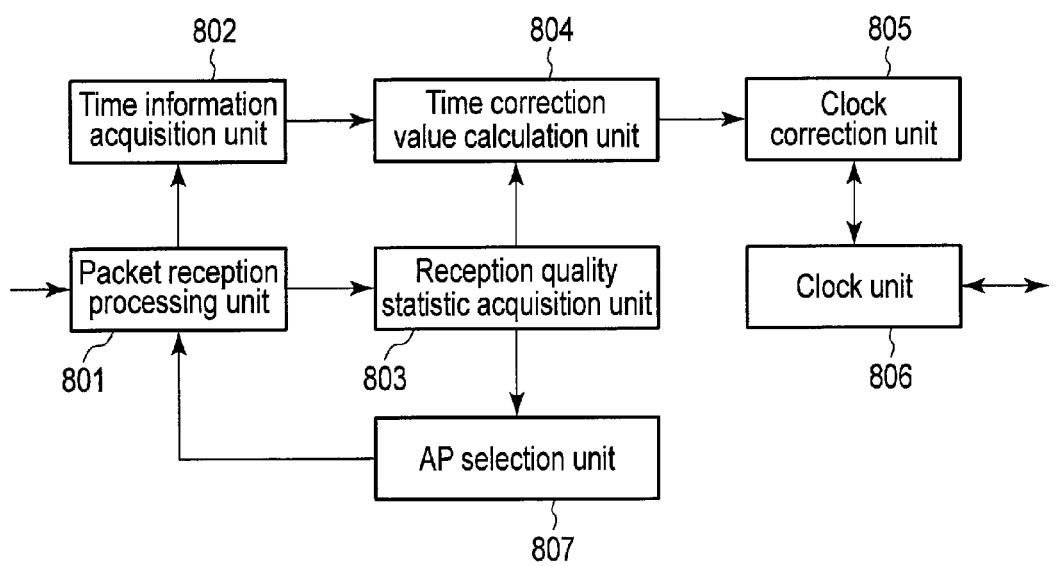
F I G. 8

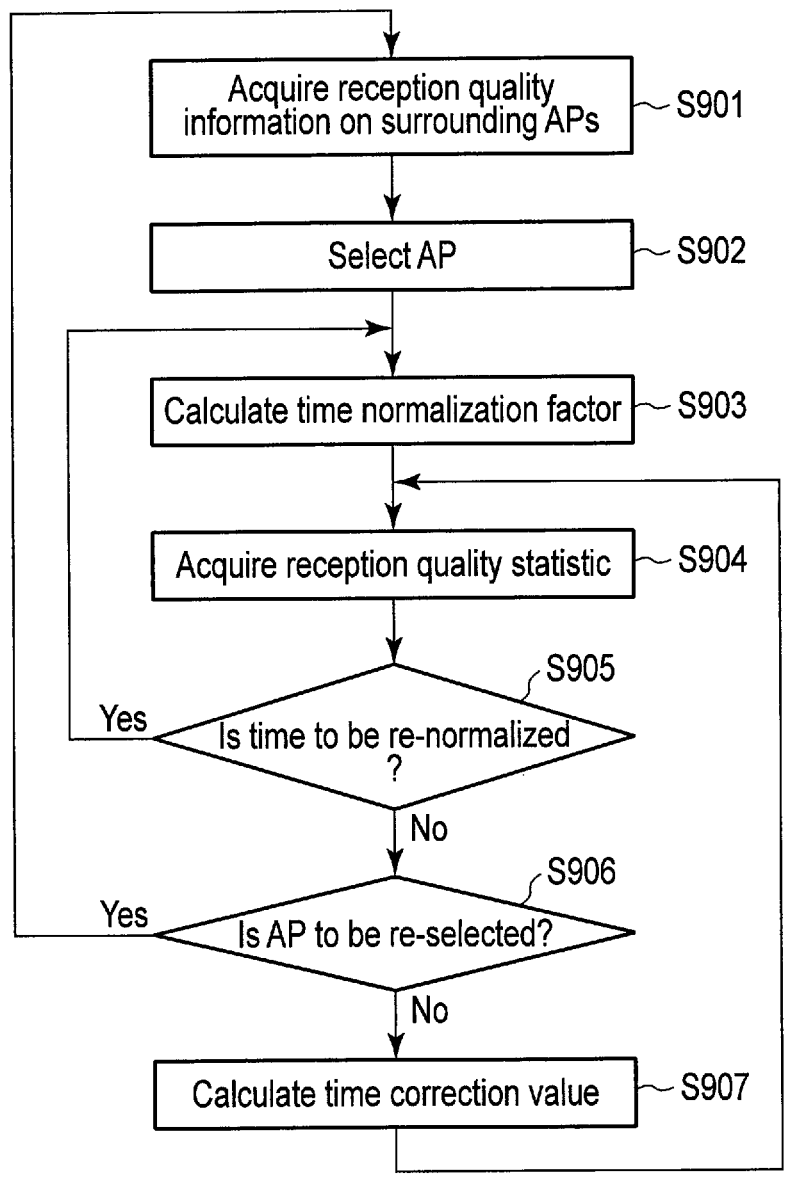
F I G. 9

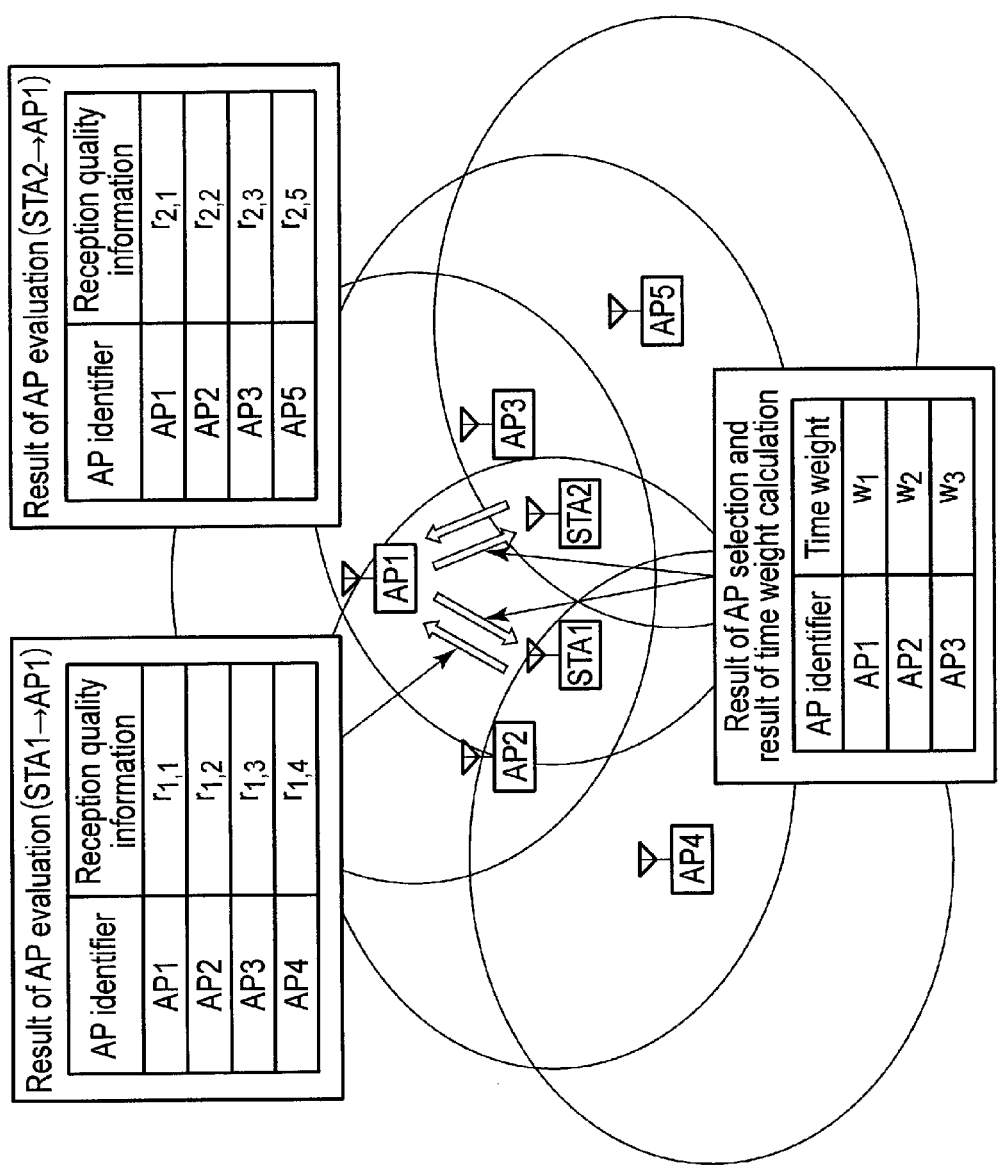
F I G. 11

WIRELESS COMMUNICATION APPARATUS AND WIRELESS COMMUNICATION SYSTEM

CROSS-REFERENCE TO RELATED APPLICATIONS

This application is based upon and claims the benefit of priority from Japanese Patent Application No. 2013-130386, filed Jun. 21, 2013, the entire contents of which are incorporated herein by reference.

FIELD

Embodiments relate to time synchronization utilizing wireless communication.

BACKGROUND

In a wireless LAN (Local Area Network), an AP (Access Point) transmits a beacon packet containing time information (hereinafter referred to as a time stamp) from a clock inside the AP. Then, an STA (STAtion) connected to the AP (that is, the STA having the same SSID (Service Set ID) as the SSID of the AP) receives the beacon packet and matches the time information from the clock inside the STA with the time stamp contained in the received beacon packet. As a result, time synchronization is achieved among a plurality of STAs connected to the same AP.

However, according to such a synchronization technique, if a failure occurs in the AP or if the beacon packet from the AP fails to be received due to, for example, a variation in wireless propagation path, maintaining the time synchronization among the plurality of STAs connected to the AP is difficult.

It is assumed that the plurality of STAs use a certain technique to switch their connections to another AP. However, different APs measure different absolute times, and hence, the time stamp utilized for time synchronization before the switching may differ significantly from a time stamp utilized for time synchronization after the switching.

A plurality of APs that transmit beacon packets may be arranged around the plurality of STAs. However, it is not always appropriate to utilize the average value of the time stamps contained in the beacon packets from the plurality of APs, as a target time for time synchronization. This is due to the following two problems.

First, as described above, different APs generally measure different absolute times, and thus, the absolute value of the time stamp may vary among the plurality of APs. That is, the degree of the effect of the time stamp from each AP on the target time is not uniform. Second, links among the plurality of APs and the plurality of STAs are not necessarily stable. It may be difficult for a certain STA to stably receive beacon packets from a certain AP.

BRIEF DESCRIPTION OF THE DRAWINGS

FIG. 1 is a diagram illustrating a wireless communication system including a wireless communication apparatus according to a first embodiment;

FIG. 2 is a diagram showing a modification of the wireless communication system in FIG. 1;

FIG. 5 is a flow chart illustrating operations of a reception quality statistic acquisition unit and a time correction value calculation unit both shown in FIG. 4;

FIG. 6 is a block diagram illustrating the time correction value calculation unit in FIG. 4;

FIG. 7 is a diagram illustrating time synchronization carried out by the wireless communication apparatus according to the first embodiment;

FIG. 8 is a block diagram illustrating a MAC unit of a wireless communication apparatus according to a second embodiment;

FIG. 9 is a flowchart illustrating operations of a reception quality statistic acquisition unit, a time correction value calculation unit, and an AP selection unit all shown in FIG. 8;

FIG. 11 is a diagram illustrating operations of the wireless communication system according to the third embodiment;

DETAILED DESCRIPTION

Figure 3:
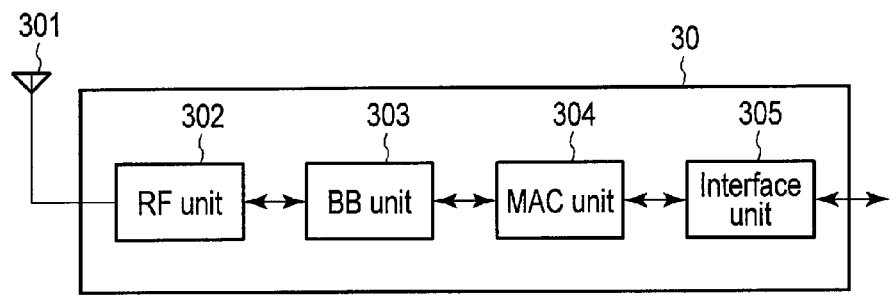
FIG. 3 is a block diagram illustrating the wireless communication apparatus according to the first embodiment.

Embodiments will be described below with reference to the drawings.

According to an embodiment, a wireless communication unit includes a media access control (MAC) unit. The MAC unit carries out a MAC process on a received packet. The MAC unit includes a clock unit, an extraction unit, an acquisition unit and a calculation unit. The clock unit includes a register which stores periodically counted-up first time information. The extraction unit extracts second time information contained in the received packet. The acquisition unit acquires a statistic for reception quality information on the received packet. The calculation unit normalizes the second time information, weights the normalized second time information using a time weight based on the statistic, and calculates a time correction value for correcting the first time information, using the weighted and normalized second time information. The time weight increases with increasing link stability indicated by the statistic.

Components that are the same as or similar to corresponding described components are denoted by the same or similar reference numerals, and duplicate descriptions are basically omitted.

First Embodiment

A wireless communication apparatus according to a first embodiment forms, for example, a wireless communication system shown in FIG. 1. The wireless communication system in FIG. 1 is based on an infrastructure mode for a wireless LAN. The wireless communication system in FIG. 1 includes an STA 101-1 and an STA 101-2 which are connected to an AP 100-1. Moreover, in the wireless communication system in FIG. 1, an AP 100-2 and an AP 100-3 are arranged around the STA 101-1 and the STA 101-2. In FIG. 1, the STA 101-1 and the STA 101-2 correspond to wireless communication apparatuses according to the first embodiment.

In a common wireless LAN system, a given STA matches time information from a clock inside the STA with a time stamp contained in a beacon packet from an AP to which the STA is connected. As a result, time synchronization is achieved between the STA and the AP to which the STA is connected and further among a plurality of STAs connected to the AP.

The STA 101-1 and the STA 101-2 achieve time synchronization utilizing time stamps contained in beacon packets from not only the AP 100-1 to which the STA 101-1 and the STA 101-2 are connected but also an AP 100-2 and an AP 100-3 which surround the STA 101-1 and the STA 101-2, as described below. In FIG. 1, arrows from the APs to the STAs represent at least transmission of beacon packets.

Time information from the clocks inside the STA 101-1 and the STA 101-2 is referenced by hosts Host 102-1 and Host 102-2. Arrows from the STAs to the hosts represent at least output of time information. Such information is output utilizing a pulse width modulation (PWM) wave or a pulse wave via wired communication.

Thus, if time synchronization has been achieved between the STA 101-1 and the STA 101-2, time synchronization can also be achieved between the Host 102-1 and the Host 102-2. As a result, the Host 102-1 and the Host 102-2 can perform efficient cooperative operations based on a common time.

Specifically, the Host 102-1 and the Host 102-2 may be inverters. When the Host 102-1 and the Host 102-2 are inverters, output powers from the Host 102-1 and the Host 102-2 can be synchronized with each other in terms of phase. Phase synchronized output powers are synthesized to efficiently generate higher power. This is expected to reduce the size of a reactor or to eliminate the need for the reactor, thus reducing the costs of the apparatus.

The first embodiment is hereinafter assumed to be applied to the wireless communication system illustrated in FIG. 1 for convenience. However, the first embodiment may be applied to another wireless communication system.

For example, the wireless communication apparatus according to the first embodiment may form a wireless communication system illustrated in FIG. 2 instead of the wireless communication system illustrated in FIG. 1. The wireless communication system in FIG. 2 is also based on the infrastructure mode for the wireless LAN. The wireless communication system in FIG. 2 includes an STA 201-1 connected to an AP 200-1. Moreover, in the wireless communication system in FIG. 2, an AP 200-2 and an AP 200-3 are arranged around the STA 201-1 and the AP 200-1. In FIG. 2, the STA 201-1 and the AP 200-1 correspond to wireless communication apparatuses according to the first embodiment.

The STA 201-1 achieves time synchronization utilizing time stamps contained in beacon packets from not only the AP 200-1 to which the STA 201-1 is connected but also an AP 200-2 and an AP 200-3 which surround the STA 201-1. Moreover, the AP 200-1 achieves time synchronization utilizing time stamps contained in beacon packets from the AP 200-2 and the AP 200-3 which surround the AP 200-1. In FIG. 2, arrows from the APs to the STA and from the AP to the AP represent at least transmission of beacon packets.

Time information from the clocks inside the STA 201-1 and the AP 200-1 is referenced by a Host 202-1 and a Host 202-2. In FIG. 2, arrows from the STA to the host and from the AP to the host represent at least output of time information. Such information is output utilizing a pulse width modulation wave via wired communication.

Thus, if time synchronization has been achieved between the STA 201-1 and the AP 200-1, time synchronization can also be achieved between the Host 202-1 and the Host 202-2. As a result, the Host 202-1 and the Host 202-2 can perform efficient cooperative operations based on a common time.

FIG. 1 and FIG. 2 show a wireless communication system based on the infrastructure mode. However, the first embodiment may be applied to a wireless communication system based on an ad-hoc mode. A wireless communication specification adopted for the wireless communication system is not limited to the wireless LAN but may be ZigBee or another specification.

The wireless communication apparatus according to the first embodiment is illustrated in FIG. 3. A wireless communication apparatus 30 in FIG. 3 comprises an antenna 301, an RF unit 302, a BB unit 303, a MAC unit 304, and an interface unit 305. A wireless transmission function is not essential for the wireless communication apparatus 30 and will thus not be described below. However, the wireless communication apparatus 30 may comprise a wireless transmission function.

The antenna 301 outputs a received RF signal to the RF unit 302. The RF unit 302 carries out general analog signal processing on the received RF signal to generate a received baseband signal. The BB unit 303 carries out general baseband signal processing on the received baseband signal to generate a received packet. The BB unit 303 outputs the received packet itself and reception quality information on the received packet to the MAC unit 304.

The MAC unit 304 uses the received packet to carry out a MAC process. For example, the MAC unit 304 comprises a clock and corrects time information from the clock based on a time stamp contained in a received beacon packet. The MAC unit 304 outputs the time information from the clock to the interface unit 305. The MAC unit 304 will be described below in detail.

The interface unit 305 outputs the time information from the clock to a host (not shown in the drawings). The information may be output utilizing a pulse wave modulation wave via wired communication.

Figure 4:
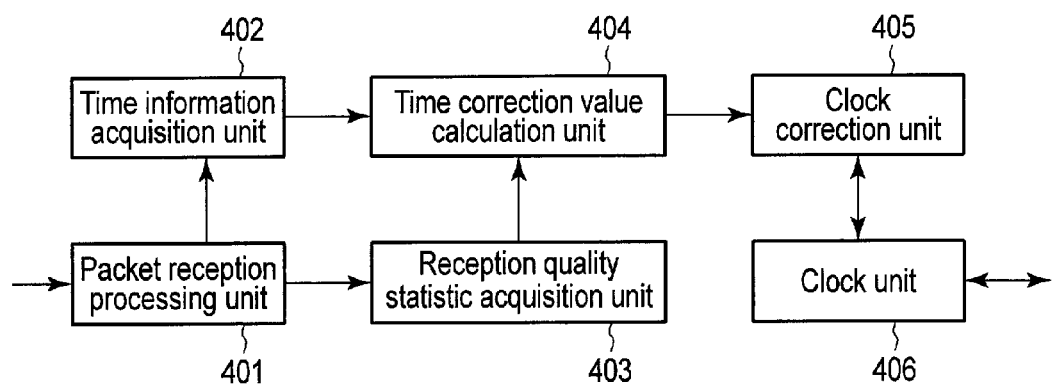
FIG. 4 is a block diagram illustrating a MAC (Media Access Control) unit in FIG. 3.

As illustrated in FIG. 4, the MAC unit 304 may comprise a packet reception processing unit 401, a time information acquisition unit 402, a reception quality statistic acquisition unit 403, a time correction value calculation unit 404, a clock correction unit 405, and a clock unit 406.

The packet reception processing unit 401 carries out a process of receiving packets. Specifically, the packet reception processing unit 401 inputs a received packet from the BB unit 303 to extract a MAC header contained in the received packet. The packet reception processing unit 401 outputs the extracted MAC header to the time information acquisition unit 402. Moreover, the packet reception processing unit 401 inputs reception quality information on the received packet from the BB unit 303 and outputs the reception quality information to the reception quality statistic acquisition unit 403.

The time information acquisition unit 402 inputs the MAC header from the packet reception processing unit 401 to acquire time information (for example, a time stamp) contained in the MAC header. The time information acquisition unit 402 outputs the acquired time information to the time correction value calculation unit 404.

The reception quality statistic acquisition unit 403 inputs the reception quality information from the packet reception processing unit 401 and carries out a statistical process described below on the reception quality information to acquire a reception quality statistic. The reception quality statistic acquisition unit 403 outputs the acquired reception quality statistic to the time correction value calculation unit 404.

The time correction value calculation unit 404 calculates a time correction value indicative of a target time based on the time information from the time information acquisition unit 402 and the reception quality statistic from the reception quality statistic acquisition unit 403. The time correction value calculation unit 404 outputs the calculated time correction value to the clock correction unit 405. The time correction value calculation unit 404 will be described below in detail.

The clock correction unit 405 inputs the time correction value from the time correction value calculation unit 404 and uses the time correction value to correct the time information from the clock unit 406.

The clock unit 406 is implemented as, for example, an oscillator, a central processing unit (CPU), and a register inside the CPU.

In this example of implementation, the CPU counts up a count value (that is, time information) stored in the register in accordance with a substantially periodic output from the oscillator, to allow the clock unit 406 to realize time measurement. When the clock unit 406 is assumed to be configured as described above, the time information may be corrected by rewriting the count value using a time correction value. Alternatively, the time information may be corrected by providing a storage area for the time correction value in the register aside from a storage area for the count value so that the CPU, when referencing the time information, can logically calculate the count value and the time correction value.

The first embodiment achieves time synchronization among a plurality of STAs. As described below, the target time for the plurality of STAs is determined based not only on the time in the AP to which the STAs are connected but also the times in surrounding APs. Hence, wireless communication operations may be affected by a possible, excessively large difference between the time information from the clocks in the plurality of STAs and the time information from the clock in the AP to which the STAs are connected. Thus, each of the STAs may be provided with a first clock for wireless communication and a second clock providing a time referenced by the host. In this case, the first embodiment is applied to the second clock but not applied to the first clock. In short, the first clock in each of the STAs uses a technique utilized in normal wireless communication to synchronize with the clock in the AP to which the STA is connected.

The MAC unit 304 illustrated in FIG. 4 may be implemented by the CPU and the register. In this case, the operation of each functional unit can be achieved by executing a program stored in the register. Furthermore, transmission of information among the functional units can be achieved by storing the information in any area of the register and specifying and referencing the area.

The reception quality statistic acquisition unit 403 and the time correction value calculation unit 404 may operate as illustrated in FIG. 5. Processing in FIG. 5 starts with step S501. In step S501, the time correction value calculation unit 404 calculates a time normalization factor. Specifically, the time correction value calculation unit 404 calculates a zeroth-order time normalization factor for compensating for the difference between absolute times measured in a plurality of different APs. Moreover, the time correction value calculation unit 404 may calculate a first-order time normalization factor for compensating for a difference in clock frequency drift among the plurality of different APs.

As described above, different APs measure different absolute times. Unless the difference in absolute time is compensated for, a time stamp with a larger or smaller absolute value has a higher effect on the target time. The target time is not stable if beacon packets containing time stamps with high degrees of effect fail to be stably received. Thus, the time correction value calculation unit 404 reduces such a bias in the degree of effect by using the time normalization factor to normalize the time stamps.

The time in any APi ($=T_{APi}$) (i=1, 2, . . . ) relative to the time ($=t$) in the STA, serving as the wireless communication apparatus according to the first embodiment, can be expressed by Expression (1) where an index identifying an AP is denoted by i.

$$T_{APi} = a_{APi} t + b_{APi} \tag{1}$$

In Expression (1), a drift of the clock frequency in APi relative to the clock frequency in the STA is denoted by $a_{APi}$. An offset of the clock in the APi relative to the clock in the STA is denoted by $b_{APi}$.

The zeroth-order time normalization factor corresponds to the clock offset $\Delta_{j,i}$ of the clock in an APj relative to the clock in the APi, serving as a reference for normalization (for example, the AP to which the STA serving as the wireless communication apparatus according to the first embodiment is connected). Here, an index identifying an AP is denoted by j, and j≠i. That is, the time correction value calculation unit 404 may calculate Expression (2).

$$\Delta_{j,i} = T_{APj} - T_{APi} \tag{2}$$

If i=1 and the total number of sources of transmission of beacon packets (APs) that can be received by the STA is denoted by N, the time correction value calculation unit 404 calculates $\Delta = [\Delta_{2,1}, \ldots, \Delta_{N,1}]$ to obtain the zeroth-order time normalization factor.

Moreover, the time correction value calculation unit 404 may calculate $a = [a_{APi}, a_{APN}]$ to obtain the first-order time normalization factor. The time correction value calculation unit 404 can derive a relative clock frequency drift $a_{APi}$ for any APi by the following expression:

$$a_{APi} = \frac{\sum_{m=1}^{M} (t_{i,m} - avg(t_i))(T_{APi,m} - avg(T_{APi}))}{\sum_{m=1}^{M} (t_{i,m} - avg(t_i))^2} \tag{3}$$

Expression (3) represents linear regression based on the least squares method. In Expression (3), the time in an APi (a time stamp contained in a received beacon packet from the APi) acquired in the mth reception (m=1, . . . , M) is denoted by $T_{APi,m}$. An arithmetic mean of the $T_{APi,1}, \ldots, T_{APi,m}$ is denoted by $avg(T_{APi})$. The time in the STA (the time information from the clock inside the STA) measured when $T_{APi,M}$ is acquired is denoted by $t_{i,m}$. An arithmetic mean of the $t_{i,1}, \ldots, t_{i,M}$ is denoted by $avg(t_i)$.

After step S501, step S502 and step S504 are carried out each time a beacon packet is received. When a predetermined condition is met after step S501, the processing in step S501 may be carried out again (step S503). The predetermined condition may be that, for example, an elapsed time from the last execution of step S501 exceeds a threshold. Determination of whether or not the condition is met can be made, for example, using a timer (not shown in the drawings). The threshold may be determined by an experimental technique.

In step S502, the reception quality statistic acquisition unit 403 inputs reception quality information on a beacon packet from the packet reception processing unit 401. The reception quality statistic acquisition unit 403 then carries out a statistical process on the reception quality information to obtain a reception quality statistic for the source (AP) of transmission of the beacon packet. The operation of the reception quality statistic acquisition unit 403 depends on the type of the reception quality information.

For example, the reception quality information may be a received signal strength indicator (RSSI), a signal to noise ratio (SNR), a signal to interference and noise ratio (SINR), or the like. The reception quality statistic acquisition unit 403 may carry out a time smoothing (averaging) process on such reception quality information to mitigate the adverse effect of fading in a short section of a wireless propagation path, thus acquiring a reception quality statistic.

Alternatively, the reception quality information may be information indicative of a failure to receive a packet or a success in reception. The reception quality statistic acquisition unit 403 may carry out a statistical process on the reception quality information to acquire a reception quality statistic that is a value indicative of a rate at which reception of a packet fails (packet error rate (PER)) or a rate at which reception of a packet succeeds (=1-PER).

After step S502, the process proceeds to step S504. In step S504, the time correction value calculation unit 404 calculates a time correction value based on the time information from the time information acquisition unit 402 and the reception quality statistic from the reception quality statistic acquisition unit 403. The time correction value calculation unit 404 may be implemented as illustrated in FIG. 6 in order to achieve the above-described process.

The time correction value calculation unit 404 in FIG. 6 comprises a time normalization unit 601, a time weight calculation unit 602, a first multiplication unit, a time smoothing coefficient setting unit 603, a second multiplication unit, a third multiplication unit, and an addition unit.

The time normalization unit 601 normalizes the time information using the time normalization factor calculated in step S501. For example, if the AP1 serves as a reference for normalization, the time normalization unit 601 may use the zeroth-order time normalization factor to normalize time information Ti from the APi as shown in the following expression:

$$\tilde{T}_i = T_i - \Delta_{i,1} \quad (4)$$

A left side of Expression (4) represents normalized time information. The time normalization unit 601 outputs the normalized time information to the first multiplication unit.

Alternatively, the time normalization unit 601 may use the zeroth-order time normalization factor and the first-order time normalization factor to normalize the time information Ti from the APi as shown in the following expression:

$$\tilde{T}_i = T_i - \Delta_{i,1} + a_{APi} \delta \quad (5)$$

In Expression (5), an elapsed time from the calculation of the first-order time normalization factor $a_{APi}$ is denoted by $\delta$. The elapsed time $\delta$ can be derived based on the time information from the clock inside the STA.

The time weight calculation unit 602 calculates a time weight based on the reception quality statistic acquired in step S502. For example, if PER has been acquired in step S502 as a reception quality statistic, the time weight calculation unit 602 may calculate the time weight in accordance with the following expression:

$$w_i = \frac{1 - r_i}{\sum_{n=1}^{N}(1 - r_n)} \quad (6)$$

In Expression (6), the reception quality statistic for the $AP_i$ is denoted by $r_i$, and the time weight provided for the time information from the APi is denoted by $w_i$. However, a technique for calculating the time weight may vary depending on the characteristics of the reception quality statistic. In summary, the time weight calculation unit 602 calculates the time weight $w_i$ such that the time weight $w_i$ increases with increasing the stability of links for the APi. For example, when the reception quality statistic is the PER, the instability of the links increases with increasing the reception quality statistic. However, when the reception quality statistic is the mean value of the RSSI, the stability of the links increases with increasing the reception quality statistic. The time weight calculation unit 602 outputs the calculated time weight to the first multiplication unit.

The time weight calculation unit 602 may calculate the time weight $w_i$, for example, in accordance with Expression (7) shown below such that the time weight $w_i$ increases with a decreasing first-order time normalization factor described above (relative clock frequency drift $a_{APi}$).

$$w_i = \frac{\sum_{n=1}^{N} a_{APn}}{a_{APi}} \quad (7)$$

Alternatively, the time weight calculation unit 602 may calculate the time weight based both on the reception quality statistic and on the first-order time normalization factor. For example, the time weight calculation unit 602 may calculate the time weight such that the time weight increases with increasing link stability indicated by the reception quality statistic and increases with a decreasing first-order time normalization factor.

The first multiplication unit inputs the normalized time information and the time weight from the time normalization unit 601 and the time weight calculation unit 602, respectively, to multiply the normalized time information by the time weight. The first multiplication unit outputs a multiplication result (weighted and normalized time information) to the second multiplication unit.

The time smoothing coefficient setting unit 603 sets a time smoothing coefficient π. In this case, 0≤ρ≤1. The time smoothing coefficient ρ represents the degree of dependence on an uncorrected time for time correction. For example, the time smoothing coefficient setting unit 603 may set experimentally determined ρ. The time smoothing coefficient setting unit 603 outputs ρ and (1-ρ) to the third multiplication unit and the second multiplication unit, respectively.

The second multiplication unit multiplies the multiplication result from the first multiplication unit by (1-ρ) and outputs a new multiplication result to the addition unit. The third multiplication unit inputs the uncorrected time (that is, the current time information from the clock unit 406) and multiplies the uncorrected time by ρ. The third multiplication unit outputs a multiplication result to the addition unit.

The addition unit adds the multiplication result from the second multiplication unit and the multiplication result from the third multiplication unit together to generate a corrected time (that is, a time correction value).

In summary, the time correction value calculation unit 404 in FIG. 6 calculates the time correction value in accordance with the following expression:

$$T^+ = \rho T^- + (1-\rho) w_i \tilde{T}_i \quad (8)$$

In Expression (8), the time correction value is denoted by $T^+$, and the current time information from the clock unit 406 is denoted by $T^-$. However, the time correction value calculation unit 404 may calculate the time correction value in a manner of calculation different from the manner of calculation in Expression (8).

The wireless communication apparatus according to the first embodiment can carry out time synchronization illustrated in FIG. 7. FIG. 7 shows the wireless communication apparatus according to the first embodiment as STA1 and STA2. The STA1 and the STA2 are connected to the AP1.

In FIG. 7, the axis of abscissas shows time in the AP1, and the axis of ordinate shows each of the times in the STA1, the STA2, the AP2, and the AP3 relative to the time in the AP1. The origin of the axis of abscissas corresponds to a point in time when the time normalization and the calculation of the time correction value are carried out.

Both the STA1 and the STA2 receive beacon packets not only from the AP1 but also from the AP2 and AP3 operating around the STA1 and the STA2 to set the target time based on the time information contained in the beacon packets. That is, the time synchronization by the STA1 and the STA2 is carried out more frequently than time synchronization in a normal wireless LAN. This reduces the maximum value of a deviation in absolute time caused by a clock frequency drift among the STAs.

Moreover, in an example of operation in FIG. 7, a failure occurs in the AP1. After the failure occurs, the STA1 and the STA2 fail to receive beacon packets from the AP1 but can continue to receive beacon packets from the AP2 and the AP3. Hence, the rate of change in target time (that is, a weighted resultant value for the times in the surrounding APs) before the occurrence of the failure differs from the rate of change in target time after the occurrence of the failure, but the time synchronization between the STA1 and the STA2 continues to be maintained.

A failure may occur in all the APs around the plurality of STAs. Thus, if, for example, no packet containing time information is received for a predetermined duration, each STA may attempt to maintain time synchronization with another STA by self-correcting the time based on the elapsed time from the point in time of calculation of the previous time correction value. The self-correction may be zeroth-order time correction or first-order time correction.

The zeroth-order time correction is carried out, for example, using the following expression:

$$X_0 = T^+ - T^- = -(1-\rho)\left(T^- - w_i \tilde{T}_i\right) \quad (9)$$

$$X_1 = \frac{\tau_1}{\tau_0} X_0$$

Figure 15:
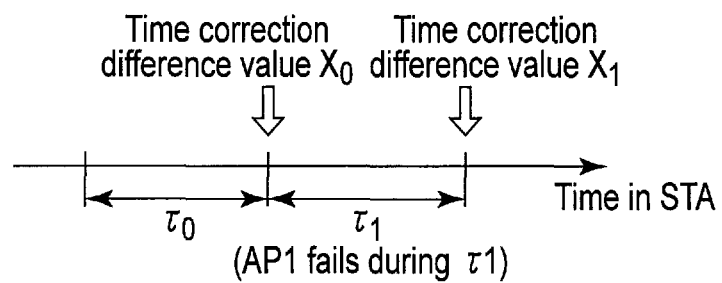
FIG. 15 is a diagram illustrating self correction of time.

Parameters in Expression (9) are illustrated in FIG. 15. A time correction difference value added to the time information during the last time synchronization (the last time synchronization achieved before a failure occurs in all the surrounding APs) is denoted by $X_0$. A time correction difference value added to the time information during the current time synchronization is denoted by $X_1$. An elapsed time from the last but one time synchronization until the last time synchronization is denoted by $\tau_0$. An elapsed time from the last time synchronization until the current time synchronization is denoted by $\tau_1$.

If, for example, the APi is a reference for normalization, the first-order time correction is carried out using the following expression:

$$T^+ = T^- + a_{APi}\delta \quad (10)$$

In Expression (10), an elapsed time from the last time synchronization is denoted by $\delta$.

Any of the APs surrounding the STA may transmit a beacon packet containing time information corresponding to an abnormal value as a result of a failure in the clock or intentionally transmit such a beacon packet. Utilizing such time information corresponding to an abnormal value may impair the stability of the time synchronization.

Hence, the STA preferably determines whether or not the time information corresponds to an abnormal value, and when the time information corresponds to an abnormal value, avoids using the time information for calculation of the time correction value. Whether or not the time information corresponds to an abnormal value may be determined depending on whether or not an error between the time information and an estimated value deviates from a predetermined acceptable range. The estimated value for the time information contained in a beacon packet from each AP can be determined based on the above-described linear regression. Furthermore, the acceptable range can be set using a standard deviation a that defines a Gaussian distribution under the assumption that the error complies with the Gaussian distribution. For example, if the upper limit and lower limit of the acceptable range are set to $\pm 3\sigma_i$, 99.70 of the sample values are accepted, while 0.3% of the sample values are excluded.

As described above, the wireless communication apparatus (STA) according to the first embodiment achieves time synchronization with another STA using the time information contained in beacon packets from not only the AP to which the wireless communication apparatus (STA) is connected but also the surrounding APs. Hence, even if a failure occurs in the AP to which the STA is connected, the STA allows the time synchronization to be maintained based on the time information from the surrounding APs.

Furthermore, the target time for each STA is calculated by normalizing the time information from the surrounding APs and performing weighting synthesis on the normalized time information according to the stability of links with the APs. That is, the weighting synthesis is such that the degree of the effect, on the target time, of the time information contained in a beacon packet is high when the beacon packet can be stably received, whereas the degree of the effect, on the target time, of the time information contained in a beacon packet is low when the beacon packet fails to be stably received. Hence, the STA can carry out stable time synchronization.

When failing to receive a packet containing time information for a predetermined duration, the STA may perform self correction. Even if no AP operating normally is present around the STA, the self correction allows suppression of an error in time information between the STA and another STA.

The STA may use a parameter (for example, a standard deviation) that defines the distribution of errors between time information contained in received packets from the surrounding APs and estimated values for the time information to set an acceptable range for the errors. Then, if an error deviates from the acceptable range, the STA may exclude the corresponding time information as an abnormal value. Excluding the time information corresponding to the abnormal value further improves the stability of time synchronization.

Second Embodiment

The wireless communication apparatus according to the first embodiment basically allows beacon packets from all surrounding APs to be utilized for time synchronization. Such an operation enables stable time synchronization, but may increase processing loads more than necessary particularly when a large number of APs are operating around.

Thus, a wireless communication apparatus according to a second embodiment selects, in an autonomous distributed manner, any of surrounding APs that has high link stability, and utilizes only beacon packets from the selected AP for time synchronization. Such an operation is expected to suppress processing loads, stabilize time synchronization, and improve accuracy.

A MAC unit of the wireless communication apparatus according to the second embodiment is illustrated in FIG. 8. The MAC unit in FIG. 8 is different from the MAC unit in FIG. 4 in that the MAC unit 8 comprises an AP selection unit 807. FIG. 8 shows a packet reception processing unit 801, a time information acquisition unit 802, a reception quality statistic acquisition unit 803, a time correction value calculation unit 804, a clock correction unit 805, and a clock unit 806 which may be the same as or similar to the packet reception processing unit 401, a time information acquisition unit 402, a reception quality statistic acquisition unit 403, a time correction value calculation unit 404, a clock correction unit 405, and a clock unit 406 all shown in FIG. 4.

The AP selection unit 807 inputs reception quality information (or a reception quality statistic) on each of surrounding APs and selects from the surrounding APs based on the link stability indicated by the reception quality information. For example, when a plurality of wireless communication apparatuses (STAs) according to the second embodiment is distributed within a range narrower than a communication range of APs, a predetermined number of APs are selected in order of decreasing RSSI to facilitate selection of an AP common to a plurality of STAs. The predetermined number of APs may be selected in order of decreasing SNR or SINR instead of RSSI or in order of increasing PER. Alternatively, the selected AP may have an RSSI, SNR, or SINR equal to or larger than a threshold or a PER equal to or smaller than a threshold. These thresholds may be experimentally determined.

The reception quality statistic acquisition unit 803, the time correction value calculation unit 804, and the AP selection unit 807 may operate as illustrated in FIG. 9. The operation illustrated in FIG. 9 differs from the corresponding operation in FIG. 5 in that the operation in FIG. 9 includes processing in step S901, step S902, and step S906. Processing in step S903, step S904, step S905, and step S907 all shown in FIG. 9 may be similar to the processing in step S501, step S502, step S503, and step S504 all shown in FIG. 5. However, it should be noted that a processing target in and after step S903 is limited to received packets from an AP selected in step S902.

The processing in FIG. 9 starts at step S901. In step S901, the reception quality statistic acquisition unit 803 acquires reception quality information (or reception quality statistics) on beacon packets from surrounding APs. Then, the AP selection unit 807 selects any of the surrounding APs to be utilized for time synchronization based on the reception quality information acquired in step S901 (step S902). After step S902, the process proceeds to step S903.

After step S902, the processing in step S901 and step S902 may be carried out again when a predetermined condition is met (step S906). The predetermined condition is, for example, that an elapsed time from the last execution of step S902 exceeds a threshold. Whether or not the condition is met can be determined, for example, using a timer (not shown in the drawings). The threshold may be determined by an experimental technique. Alternatively, the predetermined condition may be a change in the number of sources of transmission of beacon packets (APs) that can be received by the wireless communication apparatus (for example, a decrease in the number of transmission sources below a threshold). Re-selecting an AP at an appropriate timing enables a change in communication environments (for example, the wireless propagation path or the operating status of each of the surrounding APs) to be flexibly accommodated.

As described above, the wireless communication apparatus according to the second embodiment selects, in an autonomous distributed manner, any of the surrounding APs that, for example, has high link stability, and utilizes beacon packets from the selected AP for time synchronization. Thus, the wireless communication apparatus can suppress processing loads regardless of whether a large or small number of APs are operating around. Furthermore, the wireless communication apparatus avoids utilizing beacon packets from APs with instable links, improving the stability of time synchronization. Moreover, when a plurality of wireless communication apparatuses (STAs) according to the second embodiment are distributed within a range narrower than a communication range of APs, a plurality of STAs are likely to select an AP common to the STAs. This is expected to achieve more accurate time synchronization among the plurality of STAs. Moreover, the second embodiment eliminates the need to change the design of APs, allowing the existing APs to be utilized without any change.

Third Embodiment

The wireless communication apparatus (corresponding to an STA) according to the second embodiment selects, in an autonomous distributed manner, any of the surrounding APs that has high link stability, and utilizes only beacon packets from the selected AP for time synchronization. Such an operation is expected to suppress processing loads and to improve the stability and accuracy of time synchronization. However, the second embodiment does not necessarily utilize the same AP for time synchronization among a plurality of STAs.

On the other hand, a wireless communication apparatus (corresponding to an AP) according to a third embodiment selects, in a centralized control manner, an AP for time synchronization among a plurality of STAs connected to the AP (that is, the STAs having the same SSID as the SSID of the AP) based on reception quality information or reception quality statistics transmitted by the plurality of STAs. Such an operation is expected to suppress processing loads associated with the plurality of STAs and to improve the stability and accuracy of the time synchronization among the plurality of STAs. The operation further easily allows the same AP to be utilized for the time synchronization among the plurality of STAs. The AP can also calculate a time weight common to the plurality of STAs in a centralized control manner. The common time weight is expected to further suppress the processing loads associated with the plurality of STAs and improve the stability and accuracy of the time synchronization among the plurality of STAs.

It should be noted that a wireless communication apparatus (corresponding to an STA) according to the present embodiment may be similar to the wireless communication apparatus shown in FIG. 3 but needs to have a wireless transmission function (analog signal processing and baseband signal processing in transmission processing) that is at least sufficient to transmit a packet carrying a result of AP evaluation described below. Furthermore, a MAC unit of the STA may be the same as or similar to the MAC unit illustrated in FIG. 4.

On the other hand, the wireless communication apparatus (corresponding to an AP) according to the third embodiment may comprise a reception unit, a selection unit, a calculation unit, and a transmission unit, though these units are not shown in the drawings. The reception unit receives a packet carrying the result of AP evaluation described below from the plurality of STAs connected to the AP (that is, the STAs having the same SSID as the SSID of the AP). The selection unit selects from APs based on the results of AP evaluations. The calculation unit calculates a time weight for a selected AP. However, if the STA calculates the time weight, the AP need not comprise the calculation unit. The transmission unit transmits a packet carrying an identifier (and the calculated time weight) for the selected AP to the plurality of STAs.

Figure 10:
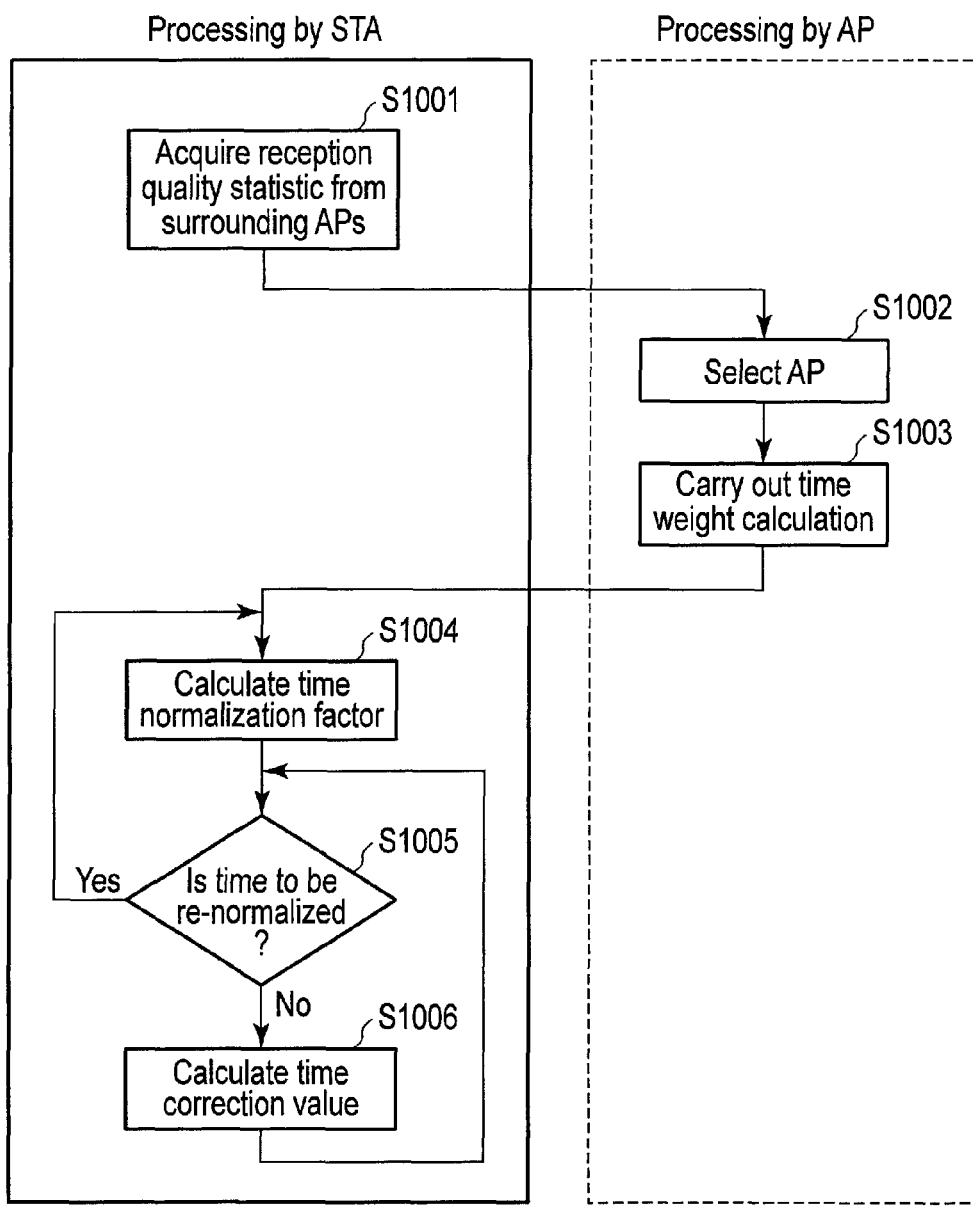
FIG. 10 is a flowchart illustrating operations of a wireless communication system according to a third embodiment.

The AP and the plurality of STAs according to the third embodiment may operate as illustrated in FIG. 10. Operations preceding and following the selection or re-selection from the APs are not specifically described in the example in FIG. 10 but will be described below in detail.

Before the selection from the APs (step S1002), each STA acquires reception quality information on the surrounding APs (step S1001). For example, one or more of the above-described RSSI, SNR, SINR, and PER may be adopted as the reception quality information. Preferably, the plurality of STAs acquire the same type of reception quality information. The reception quality information herein may be replaced with the above-described reception quality statistic. The description below assumes that the reception quality information is acquired for convenience of description.

In the example in FIG. 11, each of an STA1 and an STA2 connected to an AP1 (that is, the STA1 and the STA2 have the same SSID as the SSID of the AP1) acquires the reception quality information on beacon packets from the surrounding APs. In FIG. 11, an ellipse centered around each AP is indicative of the communication range of the AP. The STA1 fails to receive beacon packets from an AP5 but can acquire reception quality information on beacon packets from the AP1, an AP2, an AP3, and an AP4. The STA2 fails to receive beacon packets from the AP4 but can acquire reception quality information on beacon packets from the AP1, the AP2, the AP3, and the AP5.

Each STA transmits a packet carrying the result of AP evaluation (including the reception quality information on the surrounding APs acquired in step S1001 and the identifiers of the APs corresponding to the reception quality information) to the AP to which the STA is connected. The AP identifier may be any information that enables the corresponding AP to be identified and may be, for example, the MAC address or SSID of the AP. The AP obtains the results of AP evaluations acquired from the plurality of STAs through the received packets from the STAs.

The AP selects any AP for time synchronization among the plurality of STAs based on the results of AP evaluations acquired from the STAs (step S1002). Specifically, the AP may select from the surrounding APs based on the link stability indicated by the reception quality information as is the case with the above-described AP selection unit 807.

Moreover, the AP may count numbers contained in the results of AP evaluations from the plurality of STAs for each AP identifier and preferentially select any AP corresponding to an AP identifier with a larger count value. This selection allows the same AP to be utilized for time synchronization among the plurality of STAs. In the example in FIG. 11, the AP1, the AP2, and the AP3 have a count value of "2", and the AP4 and the AP5 have a count value of "1". In FIG. 11, the AP1 selects the AP1, the AP2, and the AP3, which have the larger counter value.

The AP may further calculate a time weight common to the plurality of STAs (step S1003). However, in general, reception quality information on any AP varies among the plurality of STAs. Hence, for each of the selected APs, the AP may calculate, for example, the mean value of the reception quality information contained in the results of AP evaluations from the plurality of STAs and use the average value to calculate the common time weight. In the example in FIG. 11, the AP1 calculates time weights w1, w2, and w3 common to the STA1 and the STA2 for the selected AP1, AP2, and AP3, respectively.

In step S1003, instead of the common time weight, individual time weights may be calculated (as is the case with the first embodiment and the second embodiment). Furthermore, step S1003 may be carried out by each STA instead of the AP.

The AP transmits a packet indicative of the result of the AP selection in step S1002 and the result of the time weight calculation in step S1003 to the plurality of STAs. The packet may be transmitted using broadcast or unicast. If the AP is assumed to report the common result of the AP selection and the common result of the time weight calculation to the plurality of STAs, broadcast is preferably utilized in terms of the usage efficiency of frequency. Furthermore, the AP may report, to the plurality of STAs, timing information specifying an execution timing when the time normalization factor for each STA is calculated (step S1004). Reporting of the timing information allows the plurality of STAs to calculate the time normalization factor at the same execution timing.

Step S1004, step S1005, and step S1006 may be the same as or similar to step S501, step S503, and step S504 in FIG. 5, respectively.

Figure 12:
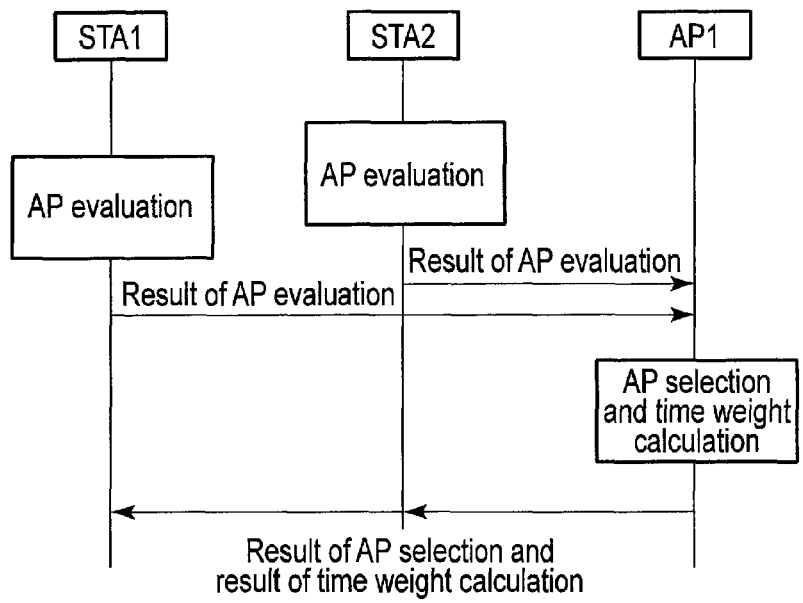
FIG. 12 is a sequence diagram illustrating operations of the wireless communication system according to the third embodiment.
Figure 13:
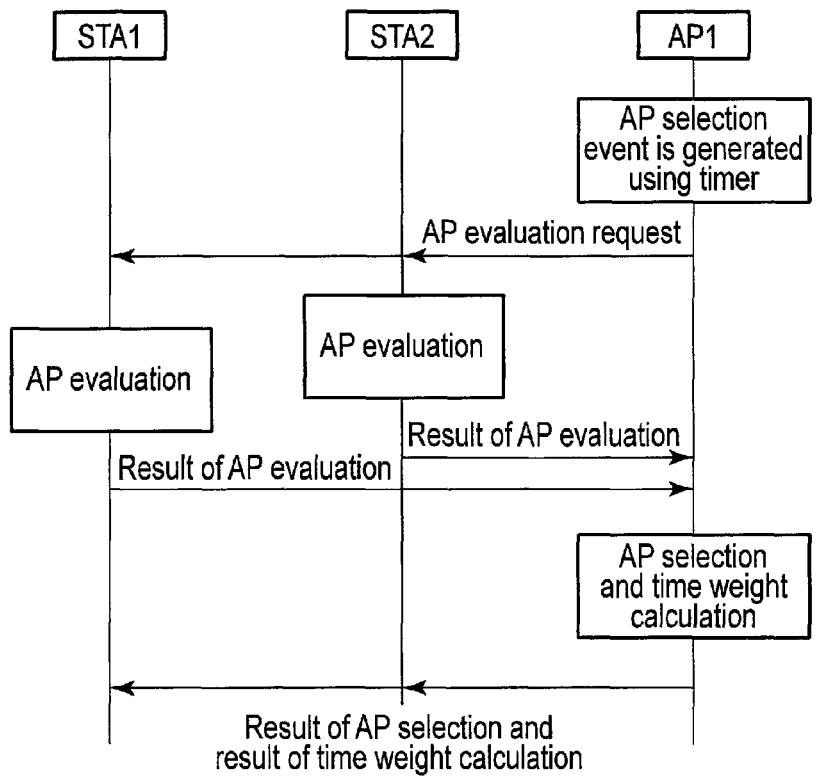
FIG. 13 is a sequence diagram illustrating operations of the wireless communication system according to the third embodiment.
Figure 14:
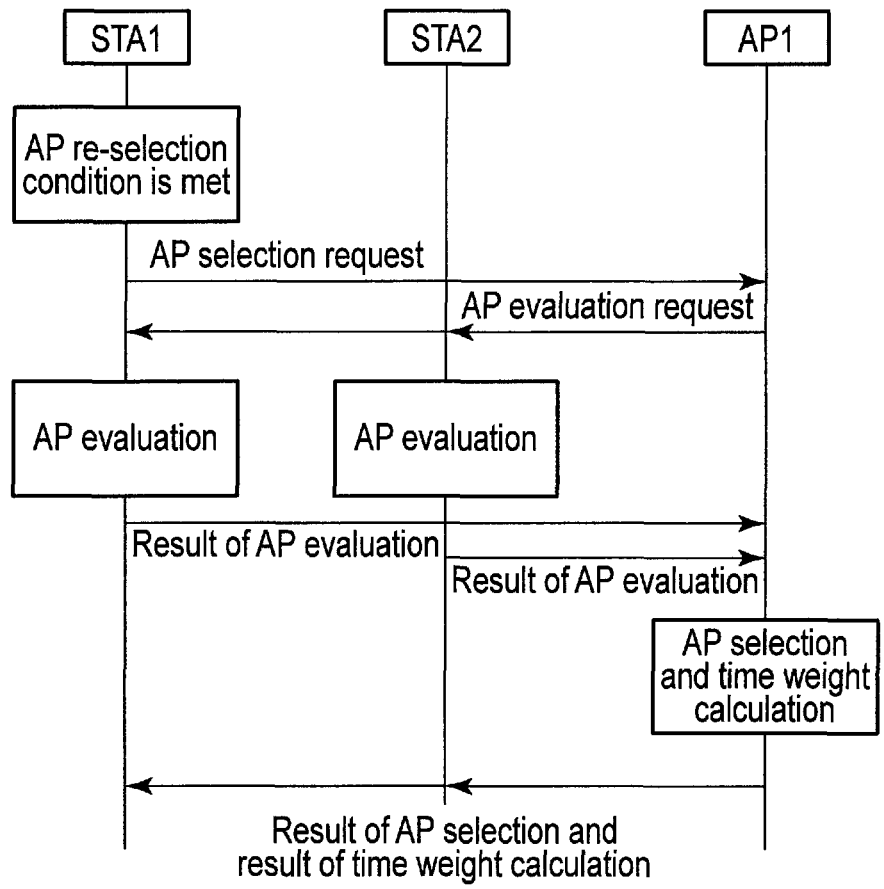
FIG. 14 is a sequence diagram illustrating operations of the wireless communication system according to the third embodiment.

The selection or re-selection from the APs may be started using any of various triggers not shown in FIG. 10. FIG. 12, FIG. 13, and FIG. 14 illustrate some of such triggers.

In the example in FIG. 12, each STA carries out AP evaluation (that is, the processing in step S1001 in FIG. 10) in an autonomous distributed manner and reports the result of the AP evaluation to the AP to which the STA is connected. Upon receiving the result of AP evaluation from all the STAs connected to the AP, the AP carries out AP selection and time weight calculation (that is, the processing in step S1002 and step S1003 both shown in FIG. 10). The AP then reports the result of the AP selection and the result of the time weight calculation to all the STAs.

In the example in FIG. 13, the AP uses a timer to periodically generate an AP selection event. When the AP selection event is generated, the AP transmits an AP evaluation request (packet) to all the STAs connected to the AP.

Upon receiving the AP evaluation request, each of the STAs carries out AP evaluation (that is, the processing in step S1001 in FIG. 10) and reports the result of the AP evaluation to the AP to which the STA is connected. After receiving the result of AP evaluation from all the STAs connected to the AP, the AP carries out AP selection and time weight calculation (that is, the processing in step S1002 and step S1003 in FIG. 10). The AP then reports the result of the AP selection and the result of the time weight calculation to all the STAs.

In the example in FIG. 14, when in any one of the plurality of STAs an AP re-selection condition is satisfied, this STA transmits an AP selection request (packet) to the AP to which the STA is connected. In this case, the AP re-selection condition may be, for example, the condition described in connection with step S906 in FIG. 9. Upon receiving the AP selection request, the AP transmits an AP evaluation request (packet) to all the STAs connected to the AP. Upon receiving the AP evaluation request, each of the STAs carries out AP evaluation (that is, the processing in step S1001 in FIG. 10) and reports the result of the AP evaluation to the AP to which the STA is connected. After receiving the result of AP evaluation from all the STAs connected to the AP, the AP carries out AP selection and time weight calculation (that is, the processing in step S1002 and step S1003 in FIG. 10). The AP then reports the result of the AP selection and the result of the time weight calculation to all the STAs.

The wireless communication apparatus (corresponding to an AP) according to the third embodiment selects, in a centralized control manner, any AP for time synchronization among the plurality of STAs connected to the AP based on the reception quality information transmitted by the plurality of STAs. Thus, the AP is expected to suppress processing loads associated with the plurality of STAs and to improve the stability and accuracy of time synchronization. The AP further easily allows the same AP to be utilized for time synchronization among the plurality of STAs.

Fourth Embodiment

In the description of the first to third embodiments, the AP and the STA are distinguished from each other. However, the roles of the AP and the STA need not be fixed. That is, the wireless communication apparatus may be designed to be able to operate either as an AP or as an STA.

Thus, a wireless communication apparatus according to a fourth embodiment is designed to selectively operate as an STA or as an AP through setting of an operation mode. The wireless communication apparatus according to the fourth embodiment may be the same as or similar to any of the wireless communication apparatuses according to the first to third embodiments. However, it should be noted that the wireless communication apparatus according to the fourth embodiment needs a wireless transmission function (analog signal processing and baseband signal processing for transmission processing) to transmit at least a beacon packet.

The operation mode of the wireless communication apparatus may be changed from an STA mode to an AP mode when a first condition is met. The first condition may be, for example, that the number of sources of transmission of beacon packets that can be received by the wireless communication apparatus is equal to or smaller than a threshold. On the other hand, the operation mode of the wireless communication apparatus may be changed from the AP mode to the STA mode when a second condition is met. The second condition may be, for example, that the number of sources of transmission of beacon packets that can be received by the wireless communication apparatus is equal to or larger than a threshold.

With the role of the wireless communication apparatus according to the fourth embodiment fixed to an STA, whether or not the wireless communication apparatus serving as an STA is to transmit beacon packets may be switched based on the first condition and the second condition. That is, the wireless communication apparatus may be set to transmit beacon packets when the first condition is met. Similarly, the wireless communication apparatus may be set to avoid transmitting beacon packets when the second condition is met.

As described above, the wireless communication apparatus according to the fourth embodiment switches the role thereof depending on a communication environment. Thus, the wireless communication apparatus allows a needed number of sources of transmission of beacon packets to be secured even without addition of excess APs in preparation for degradation of the communication environment. That is, the wireless communication apparatus enables avoidance of costs for addition of excess APs.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A wireless communication apparatus comprising a processor to process a received packet, wherein the processor comprises:

a clock to periodically count-up a first time to synchronize with a first other wireless communication apparatus;

an extractor to extract a second time from the received packet transmitted by at least a second other wireless communication apparatus different from the first other wireless communication apparatus; and a corrector to normalize the second time, and to obtain a correction time for the first time, by summing a first value and a second value, wherein the first value is based at least on a product of the first time and a first coefficient, and the second value is based at least on a product of the normalized second time and a second coefficient.

2. The apparatus according to claim 1, wherein the processor uses a parameter which defines a distribution of errors between the second time extracted from the received packet and an estimated value for the second time to set an acceptable range for the errors, and avoids using the second time extracted from the received packet for calculation of the correction time when an error in the second time deviates from the acceptable range.

3. The apparatus according to claim 1, wherein the corrector calculates a current correction time based on an elapsed time from a point in time of calculation of a previous correction time when no packet containing the second time is received for a predetermined duration.

4. The apparatus according to claim 1, wherein the processor further comprises a selector to select any of a plurality of sources of packet transmission operating around the apparatus having high link stability indicated by reception quality information, and
the correction time is calculated based on the second time contained in the received packet from the selected source of packet transmission.

5. The apparatus according to claim 4, wherein, when a re-selection condition is met after the source of packet transmission is selected, the selector re-selects any of the plurality of sources of packet transmission operating around the apparatus having high link stability indicated by the reception quality information, and
the re-selection condition is at least either that an elapsed time from a last selection of the source of packet transmission exceeds a threshold or that a number of sources of transmission of receivable packets is smaller than a threshold.

6. The apparatus according to claim 1, wherein the apparatus reports an identifier and reception quality information for each of a plurality of sources of packet transmission operating around the apparatus to a third other wireless communication apparatus, and is reported the identifier of a selected source of packet transmission by the third other wireless communication apparatus, and
the correction time is calculated based on the second time contained in the received packet from the selected source of packet transmission.

7. The apparatus according to claim 1, wherein the apparatus reports an identifier and reception quality information for each of a plurality of sources of packet transmission operating around the apparatus to a third other wireless communication apparatus, and is reported the identifier of a selected source of packet transmission and a time weight calculated for the selected source of packet transmission by the other wireless communication apparatus,
the correction time is calculated based on the second time contained in the received packet from the selected source of packet transmission, and
the corrector uses a reported time weight.

8. The apparatus according to claim 1, further comprising a transmitter to transmit a packet containing the first time when a number of sources of transmission of receivable packets is smaller than a threshold.

9. The apparatus according to claim 1, wherein the second value is a value based at least on a product of the normalized second time, the second coefficient, and a time weight, the time weight being higher when a statistic for wireless link reception quality information on the received packet being higher.

10. A wireless communication apparatus, comprising:
a receiver to receive, from each of a plurality of other wireless communication apparatuses, a packet carrying an evaluation result including an identifier and reception quality information for each of a plurality of sources of packet transmission operating around each of the other wireless communication apparatuses;
a selector to select a source of packet transmission at least either which has high link stability indicated by the reception quality information contained in the evaluation results from the plurality of other wireless communication apparatuses or which has a large count value for a number of identifiers included in the evaluation results from the plurality of other wireless communication apparatuses;
a transmitter to transmit a packet carrying the identifier of a selected source of packet transmission to the plurality of other wireless communication apparatuses; and
a calculator to calculate, for each selected source of packet transmission, a time weight based on the link stability indicated by the reception quality information contained in the evaluation results from the plurality of other wireless communication apparatuses, and
wherein the transmitter transmits a packet carrying the identifier of the selected source of packet transmission and a calculated time weight to the plurality of other wireless communication apparatuses.

11. A wireless communication system comprising a plurality of first wireless communication apparatuses and a second wireless communication apparatus, wherein each of the plurality of first wireless communication apparatuses comprises a processor to process a received packet,
wherein the processor comprises:
a clock to periodically count-up a first time to synchronize with a first other wireless communication apparatus;
an extractor to extract second time from the received packet transmitted by at least a second other wireless communication apparatus different from the first other wireless communication apparatus; and
a corrector to normalize the second time and to obtain a correction time for the first time, by summing a first value and a second value, the first value is based at least on a product of the first time and a first coefficient, and the second value is base d at least on a product of the normalized second time and a second coefficient,
each of the plurality of first wireless communication apparatuses reports an identifier and reception quality information for each of a plurality of sources of packet transmission operating around the apparatus to the second wireless communication apparatus, and is reported the identifier of a selected source of packet transmission by the second wireless communication apparatus,
the correction time is calculated based on the second time information contained in the received packet from the selected source of packet transmission, and
the second wireless communication apparatus comprises:
a receiver to receive, from each of the plurality of first wireless communication apparatuses, a packet carrying an evaluation result including an identifier and reception quality information for each of a plurality of sources of packet transmission operating around each of the plurality of first wireless communication apparatuses;
a selector to select a source of packet transmission at least either which has high link stability indicated by the reception quality information contained in the evaluation results from the plurality of first wireless communication apparatuses or which has a large count value for a number of identifiers included in the evaluation results from the plurality of first wireless communication apparatuses; and a transmitter to transmit a packet carrying the identifier of a selected source of packet transmission to the plurality of first wireless communication apparatuses.

12. A wireless communication system comprising a plurality of first wireless communication apparatuses and a second wireless communication apparatus, wherein each of the plurality of first wireless communication apparatuses comprises a processor to process a received packet, wherein the processor comprises:
a clock to periodically count-up a first time to synchronize with a first other wireless communication apparatus;
an extractor to extract second time from the received packet transmitted by at least a second other wireless communication apparatus different form the first other wireless communication apparatus; and
a corrector to normalize the second time and to obtain a correction time for the first time, by summing a first value and a second value, the first value being based at least on a product of the first time and a first coefficient, and the second value being based at least on a product of the normalized second time and a second coefficient, each of the plurality of first wireless communication apparatuses reports an identifier and reception quality information for each of a plurality of sources of packet transmission operating around the apparatus to the second wireless communication apparatus, and is reported the identifier of a selected source of packet transmission and a time weight calculated for the selected source of packet transmission by the second wireless communication apparatus, the correction time is calculated based on the second time information contained in the received packet from the selected source of packet transmission, the corrector uses a reported time weight, and the second wireless communication apparatus comprises:
a receiver to receive, from each of the plurality of first wireless communication apparatuses, a packet carrying an evaluation result including an identifier and reception quality information for each of a plurality of sources of packet transmission operating around each of the plurality of first wireless communication apparatuses;
a selector to select a source of packet transmission at least either which has high link stability indicated by the reception quality information contained in the evaluation results from the plurality of first wireless communication apparatuses or which has a large count value for a number of identifiers included in the evaluation results from the plurality of first wireless communication apparatuses;
a calculator to calculate, for each selected source of packet transmission, a time weight based on the link stability indicated by the reception quality information contained in the evaluation results from the plurality of first wireless communication apparatuses; and
a transmitter to transmit a packet carrying the identifier of a selected source of packet transmission and a calculated time weight to the plurality of first wireless communication apparatuses.

* * * * *